March 17, 1931.    C. J. ALLEN    1,796,679
FERTILIZER DISTRIBUTOR
Filed April 11, 1929
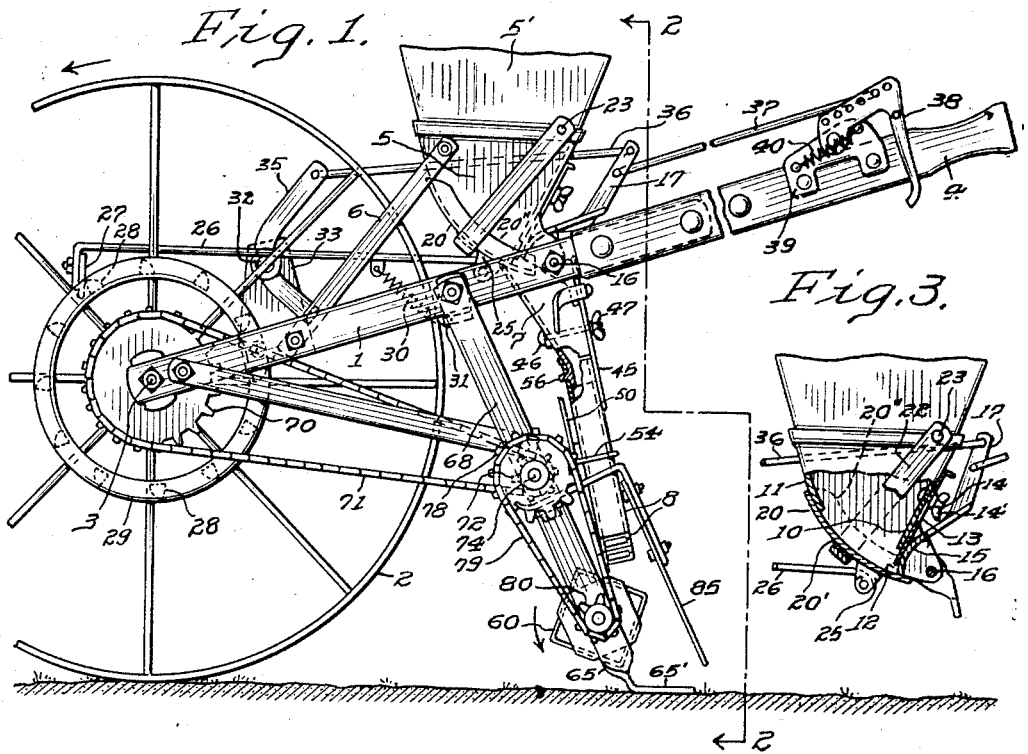
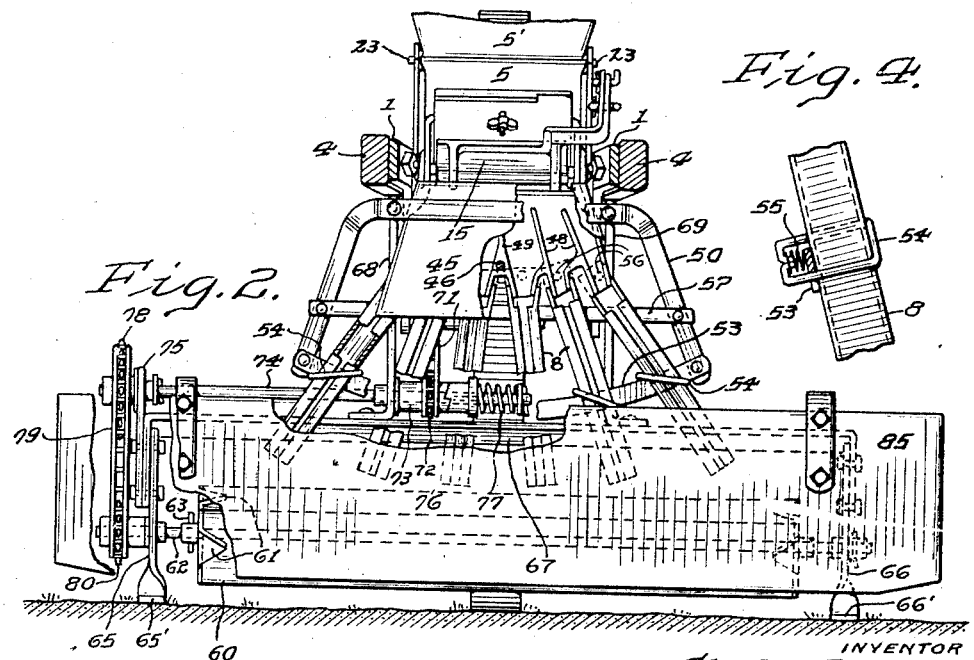
INVENTOR
Charles J. Allen
BY
ATTORNEYS
WITNESS Patented Mar. 17, 1931

1,796,679

UNITED STATES PATENT OFFICE

CHARLES J. ALLEN, OF MOORESTOWN, NEW JERSEY, ASSIGNOR TO S. L. ALLEN & CO., INC., A CORPORATION OF PENNSYLVANIA

FERTILIZER DISTRIBUTOR

Application filed April 11, 1929. Serial No. 354,198.

In the upkeep of golf course greens, fine lawns and the like it is frequently necessary to spread thereon fertilizer, chemicals or other like materials which are often relatively light in weight and generally in powdered form so that it is by no means easy to effect the desirable even, uniform distribution thereof over a relatively large area with the speed and certainty required; the present invention, therefore, is primarily directed to the provision of a machine suitable for this purpose.

Further objects of the invention are to provide in a machine of the character aforesaid means whereby the amount of fertilizer or other material distributed per unit of area can be readily controlled and to provide a machine satisfactorily operative for its intended function which is of relatively simple construction, is readily operable by the class of labor generally employed in agricultural work and which is not likely to get out of order or become damaged under the conditions of use to which such machines are necessarily subjected.

Other objects of my invention are to generally improve, simplify and render more satisfactorily operative machines of the general character of those to which my invention relates as well as to provide improvements and novel features of construction and arrangement hereinafter more specifically mentioned or which will be apparent from the following description of a machine constructed in accordance with the invention and illustrated in the accompanying drawing.

In the said drawing Fig. 1 is a fragmentary side view of the machine and Fig. 2 is a transverse section thereof on line 2—2 in Fig. 1 looking in the direction of the arrows and thus substantially constituting a rear view of certain parts of the machine; in this view some of the parts have been broken away for the sake of clearness and to better illustrate details which would otherwise be hidden. Fig. 3 is a fragmentary side elevation, partially in vertical section, of the lower part of the hopper and adjacent parts of the machine and Fig. 4 is a fragmentary detail view illustrating one of the spout clamping and adjusting means hereinafter more fully described. Like numerals are used to designate the same parts in several figures.

As shown, the machine comprises a frame embodying a pair of angularly upwardly extending and rearwardly divergent side members 1—1 between which, adjacent their front ends, a ground wheel 2 is rotatably mounted on a transversely extending axle 3 while a pair of handle bars 4—4 are extended rearwardly from the side members of the frame to afford a convenient means of propelling the machine over the ground. Above and between the side members and in the rear of the ground wheel is disposed a hopper 5 for containing the material to be distributed; this hopper is supported in position in any convenient way as, for example by struts 6 extending between the hopper and the frame and is ordinarily formed as an integral casting while to increase its capacity a sheet metal extension 5' may be arranged to project above it in the usual way. For receiving the fertilizer or other material from the hopper, a feed box 7, hereinafter more fully described, is disposed between the frame members below the hopper and arranged to communicate with a plurality of spouts 8 from the lower ends of which the fertilizer is ultimately discharged.

The hopper 5 has its rear wall 10 inclined backwardly at a suitable angle from its lower to its upper edge and its front wall 11 when viewed from the side, or at least the lower portion thereof, arranged to conform to an arc struck from a point near the juncture of the rear wall and the upper edge of the hopper while the side walls of the hopper joining the front and rear walls are preferably flat.

The lower end of the hopper rear wall 10 is cut away between the side walls to form a feed opening 12 desirably extending substantially across the hopper and an adjustable slide 13 is disposed against the outer face of the rear wall and secured thereto by a bolt 14 extending through a slot in the side and through the hopper wall in such manner that by loosening a wing nut 14' on the outer end of the bolt the slide can be raised and lowered to vary the size of the opening and can, through the medium of the wing nut, be secured in any desired position of adjustment. This slide therefore is operative to control the amount of fertilizer passing from the hopper in a given unit of time when the machine is in operation and for cutting off the flow of fertilizer entirely when desired, a gate 15 is pivoted behind the slide conveniently upon a horizontally disposed pivot 16 extending between the frame members and connected with an upwardly extending lever 17 in such manner that by oscillation of the lever the gate may be moved from open position as shown in Fig. 1 to closed position as shown in Fig. 3. Thus by suitable adjustment of the slide 14 the rate of flow of fertilizer from the hopper may be varied as desired while by manipulation of the lever 17 the gate may be disposed to permit such flow or to cut it off entirely irrespective of the adjusted position of the slide.

The front wall of the hopper is cut away from the lower edge of the feed opening, that is, from a point about in alignment with the lower extremity of the hopper side walls, for a suitable distance which desirably may be about one-half of its total length, and over the opening thus formed is disposed an agitator, generally designated as 20, and comprising a central plate-like portion 20' curved in conformity with the adjacent wall of the hopper and marginal flanges 20'' extending along the side edges of the central portion and respectively adapted to lie against the outer faces of the side walls of the hopper. The length of the agitator from its upper or front edge to its lower or rear edge is somewhat greater than the corresponding length of the opening in the front wall of the hopper and over which the agitator is disposed so that within the limits of movement of the agitator the latter will continuously overlie and close said opening; thus that portion of the agitator which is upwardly exposed through the opening at all times forms in effect a considerable portion of the bottom of the hopper and serves to support some, at least, of the superjacent fertilizer or like material in the latter.

For holding the agitator in proper position against the face of the hopper yet in such manner as to allow its oscillation thereover, a substantially U-shaped member 22 is carried about the agitator and secured thereto with its arms extending upwardly and rearwardly therefrom on each side of the hopper and a transversely extending pivot rod 23 is passed through the ends of the arms and the hopper at a point coincident with the center of the arc followed by the curved portion of the front hopper wall and over which the agitator is intended to move. The agitator is also provided with a pair of downwardly and forwardly projecting laterally spaced lugs 25 between which is received the rear end of the agitator actuating arm 26 which is turned over to form an eye through which, as well as the lugs, a pin is passed so as to pivotally connect the arm with the agitator. The opposite or forward end of this arm terminates somewhat in advance of the center of the ground wheel 2 and is there turned down substantially normal to the body of the arm and preferably provided with a removable wear plate 27 of hardened steel on its inner face, which together with the turned over end of the arm, forms a dog adapted for cooperation with peripherally spaced teeth 28 disposed on a ring 29 secured in any suitable way to the spokes of the ground wheel so as to rotate with the latter; the teeth 28 extend laterally from the ring which forms their support so as to lie substantially beneath the actuating arm and thus in alignment with the dog. A relatively heavy spring 30 is disposed between a lug on the actuating arm and a convenient point on the frame, for example, a cross member 31 extending between the side frame members, in such manner that it will continually tend to pull the actuating arm rearwardly with a considerable amount of force and therefore tend to swing the agitator to the rear, while to prevent the arm from dropping down too far a stop 32 is mounted beneath the arm on a support 33 carried by one of the frame members.

Thus as the ground wheel rotates in the direction of the arrow in Fig. 1 as the machine is pushed forwardly over the ground, the teeth 28 consecutively engage the dog at the forward end of the actuating arm and tend to move the dog and in turn the arm in a generally forward direction in opposition to the spring 30. However, by reason of the vertical support afforded the arm near its center by the stop 32 and the pivotal interconnection of the opposite end of the arm with the agitator, the force exerted on the dog is so resolved that the agitator is swung up from its lower rear position while the dog slides over the front face of each tooth until the lower edge of the dog passes the point of the latter when the spring 30 becomes effective to pull the arm rearwardly and return the agitator to lowered position. Since at the normal rate at which the machine is propelled over the ground the revolution of the ground wheel 2 is quite fast and since the teeth 28 are spaced at relatively short intervals, the successive engagement of the teeth with the dog occurs relatively rapidly so that the agitator is correspondingly rapidly oscillated across the opening in the feed hopper and substantially continuous agitation of the fertilizer therein effected. Moreover each time the agitator moves to the rear that portion of the contents of the hopper which is in more or less direct contact with the agitator is urged toward the feed opening and to some extent carried therethrough thereby materially contributing to the continuity and positiveness of the feed.

Means are also provided for lifting the actuating arm sufficiently to bring the dog out of the path of the teeth so as to keep the agitator stationary when desired, for example when moving the machine from place to place preparatory to distributing the fertilizer, said means desirably comprising a bell-crank lever 35 pivoted on the support 33 and provided at the end of its lower arm with a toe aligned with the actuating arm in such a way that when the lever is thrown forward from the position shown in Fig. 1 the toe will engage the actuating arm and lift the latter to the required height. The other or upper arm of this lever is connected through the medium of a rod 36 with the upper end of the lever 17 and the latter in turn connected by a rod 37 with a trigger 38 pivoted on a bracket 39 adjacent the outer end of the handle 4 in position for convenient operation. A spring 40 is so interconnected with this trigger that when the latter is thrown up from the position shown in Fig. 1, the spring will tend to carry the trigger over center and hold it there, while through the interconnection of the trigger with the levers 17 and 35 this movement of the trigger is effective to lift the actuating arm 26 out of the path of the teeth 28 and to close the gate 15 over the feed opening thereby shutting off the flow of fertilizer and disconnecting the agitator actuating means substantially simultaneously. Thus so long as the trigger is maintained in its raised position, the agitator remains stationary and the fertilizer is prevented from passing from the hopper but as soon as the trigger is thrown back to the position shown in Fig. 1, the agitator actuating means are again put into operative position and the gate opened to permit the fertilizer to flow from the hopper.

As stated, the fertilizer passes downwardly from the hopper into the feed box 7 disposed in rear of and below it. This box is preferably an integral casting open at the rear end and comprises downwardly divergent side and end walls and a solid front wall; a removable plate 45 held in position by a bolt 46 and wing nut 47 is provided for normally closing the open rear end of the box. As shown in Fig. 2, the box is preferably provided with a plurality of laterally spaced downwardly and outwardly divergent ribs 48 conveniently cast integral with the front wall and projecting rearwardly therefrom, those ribs lying on one side of the center line of the machine, coincident with which is a central rib 49, being outwardly and downwardly inclined toward the adjacent side of the machine and those ribs on the other side of the center line being similarly outwardly and downwardly inclined toward the side of the machine to which they are adjacent, so that in effect a plurality of divergent passages are formed in the feed box between the ribs while the lower extremities of the latter are respectively drawn in toward each other so as to form nozzles adapted to project into the upper ends of the subjacent spouts 8 which are desirably formed of sheet metal and may be of rectangular cross section. Thus the several passages are effective to direct the fertilizer into the different spouts and the latter are also so arranged as to diverge outwardly from each other on opposite sides of the center line of the machine.

It is desirable that the means provided for supporting the spouts be of such character as to readily permit their angular adjustment transversely of the machine so that the lower or delivery ends of the spouts may be brought nearer together or more widely separated as desired. Consequently, as shown, said means may comprise a generally inverted U-shaped member 50 whose center portion extends transversely across the feed box at a sufficient distance therefrom to permit the insertion of the cover plate 45 thereunder and whose arms extend downwardly and rearwardly; this member is riveted as by rivets 51 to downwardly and rearwardly extending laterally spaced ears 52 integral with the hopper which may also be utilized as supports for the feed box by suitably securing it to them. The lower or free ends of the arm of the U-shaped member are connected by a flat arcuate bar 53 and to this bar each feed spout is secured by a clamp 54 which surrounds the spout and the bar and is provided with a spring 55 so disposed as to draw the clamp forwardly and thus yieldingly press the spout against the bar with sufficient force to retain it in position thereagainst. Each spout is also pivotally supported at its upper end on one of a series of studs 56 which project forwardly from the front wall of the feed box and respectively extend through a hole in an extension formed at the upper end of each spout by projecting its front wall upwardly for a suitable distance, a transversely extending bar 57 behind the spouts serving to keep them in place on the studs. Thus by pressing on its clamp in opposition to the spring any spout can be readily swung about its pivot stud in either direction to any desired position of adjustment along the bar 53 and will be retained therein by the action of the spring clamp as soon as the pressure thereon is removed. While the means just described are well adapted for the performance of their intended function I may of course employ any other suitable means for holding the spouts in any desired means of adjustment.

As the fertilizer is delivered from the spouts it is received on a distributor, generally designated as 60, which extends transversely across the machine and is mounted for rotation about an axis disposed below and slightly forward of the delivery ends of the spouts. This distributor is of polygonal, preferably square, cross section and may be formed of sheet metal bent to the proper shape and welded or soldered at its abutting edges. Over each end of the tube so formed is disposed a cap 61 and through the caps a shaft 62 is extended and locked thereto by pins 63 or in any other suitable way so that the cap, shaft and tube rotate as a unit. I prefer to construct the distributor substantially in the manner just described as I am thereby enabled to obtain a light and satisfactory operative device but, if desired, the major portion of the distributor can be made solid instead of hollow as for example, out of a block of wood and mounted on the shaft in any convenient way so as to turn therewith.

Near its end, the shaft 62 is journaled in hangers 65 and 66 respectively disposed on opposite sides of the machine and extending downwardly and rearwardly from a cross bar 67 which is in turn supported by struts 68 and 69 riveted to the bar at their lower ends and extending upwardly and forwardly therefrom to meet the main frame members 1—1 to which they are rigidly secured. Desirably the lower ends of the hangers 65 and 66 are turned angularly rearwardly to a substantially horizontal position to provide feet 65', 66' to serve as supports for the machine in conjunction with the ground wheel 2 as shown in Fig. 1 when the machine is not in operation.

The distributor is driven from the ground wheel through the medium of a sprocket 70 carried by that wheel or its axle, a chain 71 and a smaller sprocket 72 carried by a collar 73 disposed on transversely extending shaft 74 journaled for rotation in the strap 68 and in a bracket 75 carried by the bar 67 adjacent one of its ends. The collar 73 is rotatable on the shaft 74, abuts at its outer end against the inner face of the strut 68 and at its opposite end is provided with clutch-half engaging a corresponding clutch-half on a clutch-sleeve 76 also mounted on the shaft but keyed thereto so as to rotate therewith although longitudinally slidable thereon. A spring 77 is arranged to constantly urge the clutch-sleeve toward the collar so as to maintain the clutch-halves in engagement and the latter are so designed that the shaft 74 will be rotated when the ground wheel is rotating in the direction of the arrow in Fig. 1, but when the ground wheel is rotating in the opposite direction as when the machine is being pulled backward, the clutch-halves will slip over each other and no rotation of the shaft will take pace. At the outer end of the shaft is disposed a sprocket 78 from which a chain 79 extends to a smaller sprocket 80 on the distributor shaft 62 with the result that whenever shaft 74 is rotated the distributor will be correspondingly rotated in the direction of the arrow adjacent thereto in Fig. 1. It is thus apparent that the ground wheel and the distributor rotate in the same direction when the machine is being propelled forwardly, and I regard this as distinctly important, for I have found in practice that if the distributor is rotated in the opposite direction, namely a clock-wise direction when viewed as in Fig. 1, the distribution of the fertilizer is by no means as satisfactory as when the distributor rotates in the same direction as the ground wheel.

To confine the fertilizer as much as possible to the ground in the rear of the distributor and prevent it from being thrown up toward the operator, I provide a shield 85, desirably of sheet metal, in the rear of the distributor and arrange the same to incline downwardly and rearwardly from a point above the delivery ends of the spouts to a point adjacent the ground. This shield is preferably of considerably greater length than the distributor so as to extend beyond the same in both directions and may be supported on brackets 86 secured at their forward ends to the bar 67, some provision for adjustment of the connection between the brackets and the bar being preferably provided so that the angularity of the shield and the distance between its lower edge and the ground may be varied to some extent.

Brief reference may now be made to the operation of a machine constructed substantially as heretofore described: With the gate 15 closed and the agitator actuating arm in elevated or non-operative position, the fertilizer or other material to be distributed may be placed in the hopper and the machine then wheeled to the point where distribution is to be effected by lifting the handles 4 sufficiently to clear the feet 65', 66' from the ground. If it be desired to effect the maximum width of distribution the spouts 8 are now adjusted to approximately the position shown in Fig. 2 with their delivery ends substantially equal distances apart and the outermost spouts inclined outwardly as far as possible. The slide 13 is also adjusted so as to permit the desired quantity of fertilizer to flow from the hopper and the trigger then thrown to operating position as shown in Fig. 1 so as to lower the actuating arm and raise the gate 15; the machine is now pushed ahead over the ground with the result that a regulated quantity of the fertilizer flows down into the feed box and into the several spouts and from them falls upon the rotating distributor. When the opposite end of the area which is to be fertilized is reached, the trigger 38 may be thrown forward so as to close the gate and raise the actuating arm 26 to non-operative position until the machine can be swung about on the ground wheel and headed in reverse direction on a path parallel to and adjacent the area already covered, after which the trigger is operated so as to open the gate and lower the arm 26 in the path of the teeth 28 as heretofore described. If, during this turning of the machine, or in fact at any other time, the direction of rotation of the ground wheel is reversed, the clutch on shaft 74 overruns and the distributor remains stationary.

It will be noted that the fertilizer is delivered from the spouts to the distributor at a point a little behind its axis of rotation and that each stream forms an acute angle with the subjacent distributor axis, and it is found in practice that under these conditions the fertilizer delivered from those spouts on the right hand side of the machine, when viewed from the operator's position, is thrown laterally outward toward the right and to some extent forwardly from the distributor while that delivered from the spouts on the left hand side of the machine is similarly thrown laterally outward toward the left and to some extent somewhat forwardly therefrom. It is further found that the total width of the path over which the fertilizer is distributed can be largely controlled by the angular disposition or adjustment of the spouts in correspondence with the character of the material being distributed, maximum width of distribution being obtained when a relatively light material is employed and the spouts opened outwardly to their maximum extent; under these conditions distribution is effected with evenness and regularity over a path materially wider than the length of the distributor. It would appear that whatever be the angular adjustment of the spouts, the distributing effect is analogous to that which can be obtained by giving a shovel filled with fertilizer or like material a combined forward and circular motion to thereby throw the material from the shovel both forwardly and laterally, thereby producing an entirely different effect and distributing the material over a much wider area than when the shovel is merely moved straight ahead. I attribute this result and consequent ability to distribute the material by means of my improved machine over an area, if desired, considerably wider than the length of the distributor to the fan-shaped arrangement of the delivery spouts in relation to the forwardly and relatively rapidly rotating subjacent polygonal distributor whereby all of the fertilizer is caused to impinge on the latter at an angle instead of vertically with consequent even, thorough, continuous distribution thereof over a path whose width is substantially determined by the angularly adjusted position of the spouts and which would be impossible if the spouts were disposed in parallel vertical planes, for in such case the fertilizer flowing therefrom would merely drop from the distributor in a plurality of parallel rows or ridges respectively subjacent the spouts.

Under practical conditions of operation a machine constructed in accordance with my invention is therefore extremely satisfactory and efficient in the performance of its intended function, namely, an even and regular distribution of pulverulent material over a path of considerable area and at relatively high speed so that a plot of considerable size can be adequately and properly fertilized in a comparatively short time; as stated, I attribute this result in a large measure to the angular or fan-shaped arrangement of the spouts in conjunction with the rapid rotation of the peculiarly shaped distributor in the same direction as the ground wheels when the machine is operating, although other factors, such as the continuous agitation of the material in the hopper and the regulated flow and distribution thereof to the distributor through the medium of the spouts and adjacent parts, also contribute to the ultimate result.

While I have herein described and illustrated with considerable particularly a machine constructed in accordance with a preferred embodiment of my invention, I do not thereby desire and intend to specifically confine myself to any precise details of design, construction, or arrangement of the various elements as the precise forms thereof to which I have chosen to refer may be modified in numerous particulars if desired without departing from the spirit and scope of the invention as defined in the appended claims.

Having thus described my invention, I claim and desire to protect by Letters Patent of the United States:

1. The combination with an agricultural implement of the class described, having a hopper, means for securing a substantially constant flow of pulverulent material therefrom, and means for separating said material into a plurality of divergent streams, of means adapted to intercept said streams and to effect laterally uniform diffusion of the material comprising a rotatable member of polygonal transverse section and means to effect rotation of said member about a horizontal axis.

2. The combination with an agricultural implement of the class described, having a hopper, a movable agitator adapted to furnish support to material disposed therein, and means for oscillating said agitator to assist in the discharge of said material from the hopper, of a plurality of laterally spaced divergent spouts each adapted to direct a portion of said material therefrom to distributing means comprising a rotatable member of polygonal transverse section disposed below and having its axis offset from the plane of said spouts.

3. In an agricultural implement of the class described comprising a ground wheel, a hopper, and an agitator operable through rotation of the ground wheel to effect agitation of pulverulent material disposed in said hopper and assist in its discharge therefrom, the combination of means disposed beneath the hopper adapted to receive the discharged material and direct it in a plurality of laterally divergent streams, and means adapted to intercept said streams and to effect a substantially uniform distribution of said material across a path of predetermined width comprising a rotatable member of polygonal cross section and driving means adapted to effect the rotation of said member in the same direction as the ground wheel while the distribution of said material is being accomplished.

4. In an agricultural implement of the class described comprising a ground wheel and a hopper provided with agitating means effective during the forward rotation of the ground wheel to agitate material in the hopper and assist in effecting a substantially uniform flow of said material from said hopper and adjustably arranged, and laterally spaced divergent spouts adapted to effect uniform diversion of said material in a plurality of streams, the combination of a rotatable distributor of polygonal cross section disposed subjacent the spouts and adapted to intercept said streams, and means interconnecting said member with the ground wheel effective when the ground wheel is rotated in a forward direction to rotate the distributing member in the same direction but non-effective to rotate said member when the ground wheel is rotated in the opposite direction.

5. The combination with an agricultural implement of the class described, comprising a hopper having a discharge opening, a feed box subjacent thereto and provided with a plurality of downwardly extending divergent internal ribs forming separate passages, and a plurality of spouts pivotally connected to said feed box and respectively communicating with said passages, of a transversely extending distributing member of polygonal cross section rotatable about an axis forwardly offset from the plane of and arranged below the spouts and means operative during the normal forward movement of the implement to positively rotate the said member in a predetermined direction.

6. The combination with an argricultural implement of the class described, comprising a frame, a ground wheel, a hopper supported above the frame adapted to contain material to be distributed and having a discharge opening, a feed box adjacent said opening for receiving the material therefrom, and a plurality of laterally angularly adjustable spouts respectively communicating with the feed box, of a transversely extending distributor of polygonal cross section disposed below the spouts and adapted to receive the material therefrom, means for positively driving the distributor in the same direction as the ground wheel when the machine is in operation, and means for positively agitating the material in the hopper and assisting in its discharge into the feed box.

7. In an agricultural implement of the class described, comprising a frame, a ground wheel, a hopper supported above the frame adapted to contain material to be distributed and having a discharge opening, a feed box adjacent said opening for receiving the material therefrom, and a plurality of laterally angularly adjustable spouts respectively communicating with the feed box, the combination of a transversely extending distributor of polygonal cross section disposed below the spouts, rotatable about an axis forwardly offset from the plane thereof and adapted to receive the material therefrom, means for positively driving the distributor in the same direction as the ground wheel when the machine is in operation, means for positively agitating the material in the hopper and assisting it in its discharge into the feed box and means for controlling the flow of material from the hopper to the feed box.

8. In a fertilizer distributor comprising means for conveying the fertilizer to be distributed in a plurality of separately outwardly divergent streams, the combination of a rotatable, transversely extending distributor of polygonal cross section disposed below said means to receive the fertilizer therefrom and means for positively rotating said distributor in a predetermined direction.

9. In a fertilizer distributor having a ground wheel and means for directing the fertilizer to be distributed in a plurality of separate, laterally divergent streams, a rotatable distributor of square cross section disposed below said means to receive the fertilizer therefrom and extending parallel to the axis of rotation of the ground wheel and means for driving said distributor from the ground wheel at a higher rotational speed than said wheel and in a corresponding direction when the machine is in operation.

10. In a machine of the class described, a distributor of polygonal cross section rotatable on a horizontal axis, means for rotating the distributor and means disposed above the distributor adapted to direct the material to be distributed towards the distributor in a plurality of separate angularly outwardly divergent streams whereby each stream of material is caused to impinge on the surface of the distributor at an acute angle to its axis of rotation.

11. In a machine of the class described comprising a frame, and a ground wheel supported by the frame, the combination of a distributor of polygonal cross section supported from the frame and rotatable on a horizontal axis transverse to the normal path of movement of the machine, means for rotating the distributor in the same direction as the ground wheel when the machine is being moved along said path and means above the distributor for directing the material to be distributed thereonto in a plurality of angularly outwardly divergent and separate streams, each forming an acute angle with the subjacent axis of the distributor.

12. In a machine of the class described comprising a frame, and a ground wheel supported by the frame, the combination of a distributor of polygonal cross section supported from the frame and rotatable on a horizontal axis transverse to the normal path of movement of the machine, means for rotating the distributor in the same direction as the ground wheel when the machine is being moved along said path and means above the distributor for directing the material to be distributed thereonto in a plurality of angularly outwardly divergent and separate streams, each forming an acute angle with the subjacent axis of the distributor, said distributing means being arranged to cause the streams to impinge on the distributor behind its axis of rotation.

13. In a machine of the class described comprising a frame, and a ground wheel, the combination of a distributor or square cross section supported from the frame and adapted for rotation on a horizontal axis extending transverse to the normal path of movement of the machine, means for driving the distributor in the same direction as the ground wheel when the machine is being pushed along said path, a feed box and a plurality of laterally angularly adjustable spouts extending therefrom toward the distributor and operative to direct the material to be distributed from the feed box to the distributor in a plurality of outwardly laterally divergent streams each forming an acute angle with the subjacent axis of rotation of the distributor, said spouts being so positioned as to cause the streams of material to impinge on the distributor behind its axis of rotation.

In witness whereof I have hereunto set my hand this ninth day of April, 1929.

CHARLES J. ALLEN.